US010880282B2

(12) United States Patent
Lindquist et al.

(10) Patent No.: US 10,880,282 B2
(45) Date of Patent: Dec. 29, 2020

(54) SYSTEM AND METHOD FOR REMOTELY OPERATING A SWITCH

(71) Applicant: Nimbio Labs, Inc., Las Vegas, NV (US)

(72) Inventors: Ephraim Lindquist, Las Vegas, NV (US); Howard Lederer, Las Vegas, NV (US)

(73) Assignee: Nimbio Labs, Inc., Las Vegas, NV (US)

(*) Notice: Subject to any disclaimer, the term of this patent is extended or adjusted under 35 U.S.C. 154(b) by 208 days.

(21) Appl. No.: 15/877,818

(22) Filed: Jan. 23, 2018

(65) Prior Publication Data

US 2018/0212942 A1   Jul. 26, 2018

Related U.S. Application Data

(60) Provisional application No. 62/449,539, filed on Jan. 23, 2017.

(51) Int. Cl.
| | |
|---|---|
| *G06F 21/00* | (2013.01) |
| *H04L 29/06* | (2006.01) |
| *G06F 21/33* | (2013.01) |
| *G06F 21/54* | (2013.01) |
| *G06F 8/65* | (2018.01) |

(52) U.S. Cl.
CPC ......... *H04L 63/062* (2013.01); *G06F 21/335* (2013.01); *G06F 21/54* (2013.01); *H04L 63/107* (2013.01); *G06F 8/65* (2013.01); *H04L 63/068* (2013.01)

(58) Field of Classification Search
CPC .................................................. H04L 63/062
See application file for complete search history.

(56) References Cited

U.S. PATENT DOCUMENTS

| | | | |
|---|---|---|---|
| 6,226,750 B1 * | 5/2001 | Trieger | .................. H04L 29/06 380/264 |
| 9,424,699 B2 | 8/2016 | Kusens et al. | |
| 9,450,958 B1 | 9/2016 | Saylor et al. | |

(Continued)

OTHER PUBLICATIONS

Notification of Transmittal of the International Search Report and the Written Opinion of the International Searching Authority, or the Declaration, International Application No. PCT/US18/14886, International Filing Date Jan. 23, 2018, dated Apr. 17, 2018, 8 pages.

(Continued)

*Primary Examiner* — Josnel Jeudy
(74) *Attorney, Agent, or Firm* — Dergosits & Noah LLP

(57) ABSTRACT

Systems and methods for controlling a barrier are disclosed in which a barrier control component running on a server receives a first key and a request from a user device to provide a second key and a set of abilities to a second user device. The barrier control component retrieves information associated with first key, with the information indicating whether or not the first key is authorized to provide the second key and the set of abilities to the second device. When a review of the information regarding the first key indicates that the first key is appropriately authorized, the barrier control component provides the second key to the second device, and stores the set of abilities associated with the second key.

20 Claims, 7 Drawing Sheets

(56) References Cited

U.S. PATENT DOCUMENTS

2004/0019787 A1\* 1/2004 Shibata ................ H04L 63/045
                                                                    713/168
2015/0067792 A1   3/2015 Benoit et al.
2016/0275739 A1   9/2016 Scalisi
2016/0307380 A1\* 10/2016 Ho ..................... G07C 9/00079
2020/0162905 A1   5/2020 Pemyer et al.

OTHER PUBLICATIONS

EP Communication and Supplementary Search Report for EP 18741542.7, dated Sep. 28, 2020, 10 pages.

\* cited by examiner

SYSTEM AND METHOD FOR REMOTELY OPERATING A SWITCH

CROSS-REFERENCE TO RELATED APPLICATIONS

This patent application claims priority to U.S. Provisional Patent Application No. 62/449,539, entitled "SYSTEM AND METHOD FOR REMOTELY OPERATING A SWITCH," filed on Jan. 23, 2017, which is incorporated by reference along with all other references cited in this application.

TECHNICAL FIELD

The claimed subject matter relates to the field of network communications, and more particularly to systems and methods that enable the remote operation of a switch.

BACKGROUND

Systems for remotely operating switches typically put a fixed, static set of features on the switching device, itself. The typical method of operation exposes the switching device to a local Wi-Fi network, or to Bluetooth. Once a mobile device also connects to the local network or is within Bluetooth range, the mobile device can "see" the switching device and operate it. If one is not on the local network, the user may log in using a DNS method to operate the switching device remotely. DNS access methods often lead to security issues (e.g., IoT devices have been used for DDoS attacks) because it is difficult to maintain the devices from a security perspective. It is also inconvenient due to the limitations of reaching the device easily, particularly if there is no ability to access the device from, e.g., a central server for things such as global device software updates.

Problems associated with existing systems include: the inability to communicate device status to the user after the device fails; the lack of a convenient way to update software; the inability to share access codes (also known as "keys"); the inability to modify the access granted to shared keys (e.g., the inability to limit a shared key to providing access only during a particular window of time); the inability to individually modify the privileges of shared keys; and the inability to restrict a shared key to being used by a particular user device.

DETAILED DESCRIPTION

In an embodiment, the problems associated with existing systems are addressed and alleviated using a switching device with a fully-functioning operating system that may connect with a network server and may be activated through the server using a network-enabled user device.

Figure 1:
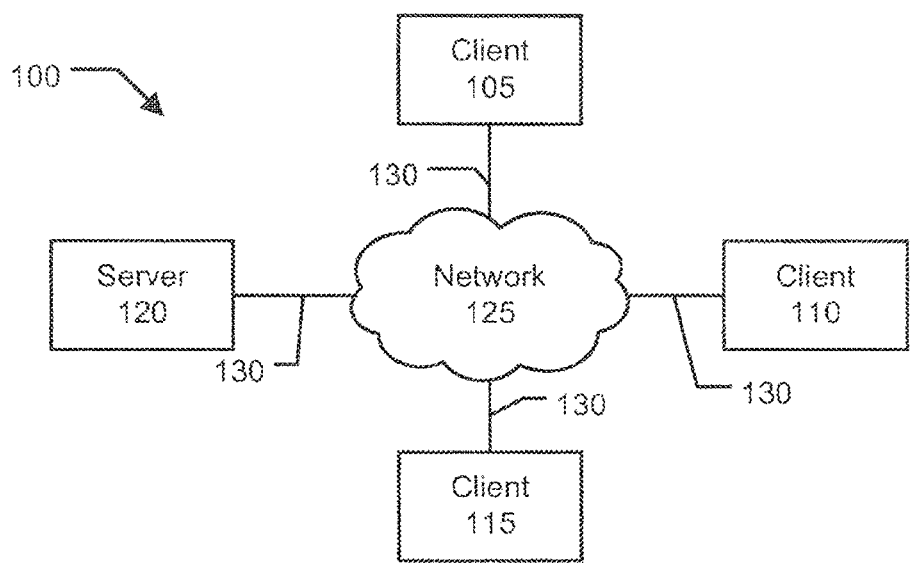
FIG. 1 shows a simplified block diagram of an embodiment of a distributed computer system for remotely operating a switch.

FIG. 1 shows a simplified block diagram of an embodiment of a distributed computer system 100 for remotely operating a switch. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 125 is the Internet, in other embodiments, communication network 125 may be any suitable communication network including a local area network (LAN), a wide area network (WAN), a wireless network, a intranet, a private network, a public network, a switched network, Internet telephony, IP telephony, digital voice, voice over broadband (VoBB), broadband telephony, Voice over IP (VoIP), public switched telephone network (PSTN), and combinations of these, and the like.

System 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system. An instance of a server system 120 and a computing device 105 may be part of the same or a different hardware system. An instance of a server system 120 may be operated by a provider different from an organization operating an embodiment of a system for specifying an object in a design, or may be operated by the same organization operating an embodiment of a system for specifying an object in a design.

Client systems 105, 110, and 115 typically request information from a server system which provides the information. Server systems by definition typically have more computing and storage capacity than client systems. However, a particular computer system may act as both a client and a server depending on whether the computer system is requesting or providing information. Aspects of the system may be embodied using a client-server environment or a cloud-cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. Some example client systems include portable electronic devices (e.g., mobile communication devices) such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. In a specific embodiment, a "web browser" application executing on a client system enables users to select, access, retrieve, or query information and/or applications stored by server system 120. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others. Client systems 105, 110, and 115 may run applications to enable users remotely operate switches according to various embodiments.

Figure 2:
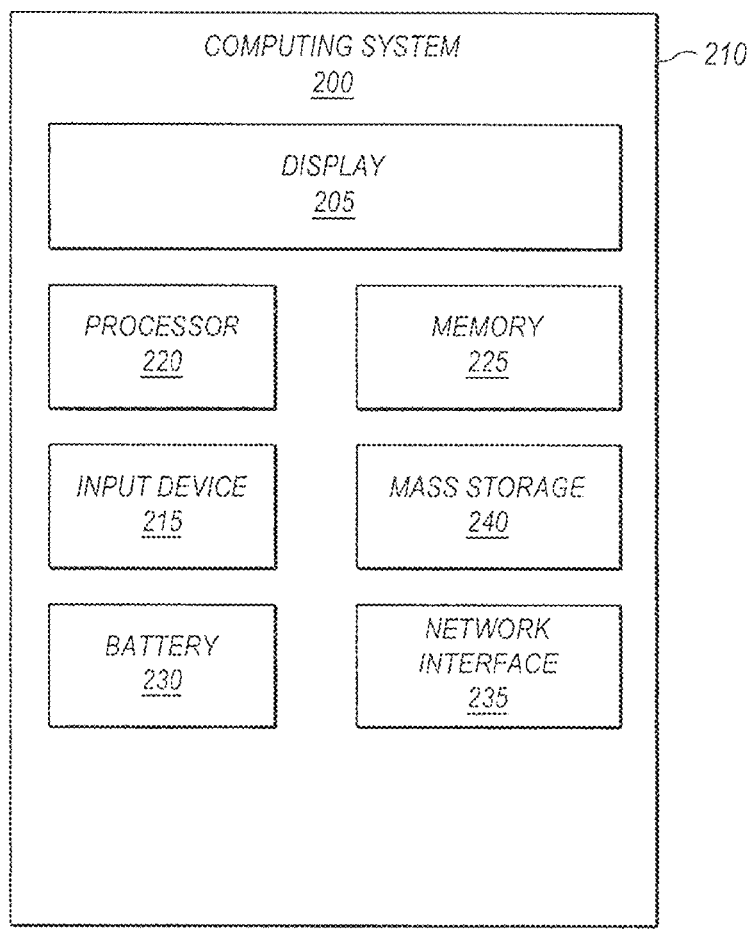
FIG. 2 shows a diagram of an example of a computing device from a system for remotely operating a switch.

FIG. 2 shows a more detailed diagram of an example of a computing device from a system for remotely operating a switch. In an embodiment, a user interfaces with the system through a client system, such as shown in FIG. 2. Mobile client communication device or portable electronic device 200 includes a display, screen, or monitor 205, housing 210, and input device 215. Housing 210 houses familiar computer components, some of which are not shown, such as a processor 220, memory 225, battery 230, speaker, transceiver, network interface 235, microphone, ports, jacks, connectors, camera, input/output (I/O) controller, display adapter, network interface, mass storage devices 240, and the like. Computer system 200 may include a bus or other communication mechanism for communicating information between components. Mass storage device (or devices) 240 may store a user application and system software components. Memory 225 may store information and instructions to be executed by processor 220.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, gestural interface (contact or non-contact gestures), biometric input sensors, or combinations of these.

Mass storage device 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

System 100 may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in a specific implementation, the computing device is mobile communication device such as a smartphone or tablet computer. Some specific examples of smartphones include the Droid Incredible and Google Nexus One®, provided by HTC Corporation, the iPhone® or iPad®, both provided by Apple, BlackBerry Z10 provided by BlackBerry (formerly Research In Motion), and many others. The computing device may be a laptop or a netbook. In another specific implementation, the computing device is a non-portable computing device such as a desktop computer or workstation.

A computer-implemented or computer-executable version of the program instructions useful to practice the present subject matter may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present subject matter may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the subject matter may be transmitted via wires, radio waves, or through a network such as the Internet. In another specific embodiment, a computer program product including a variety of software program code to implement features of the subject matter is provided.

Computer software products may be written in any of various suitable programming languages, such as C, C++, C#, Pascal, Fortran, Perl, Matlab (from MathWorks, www-.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the subject matter using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 3:
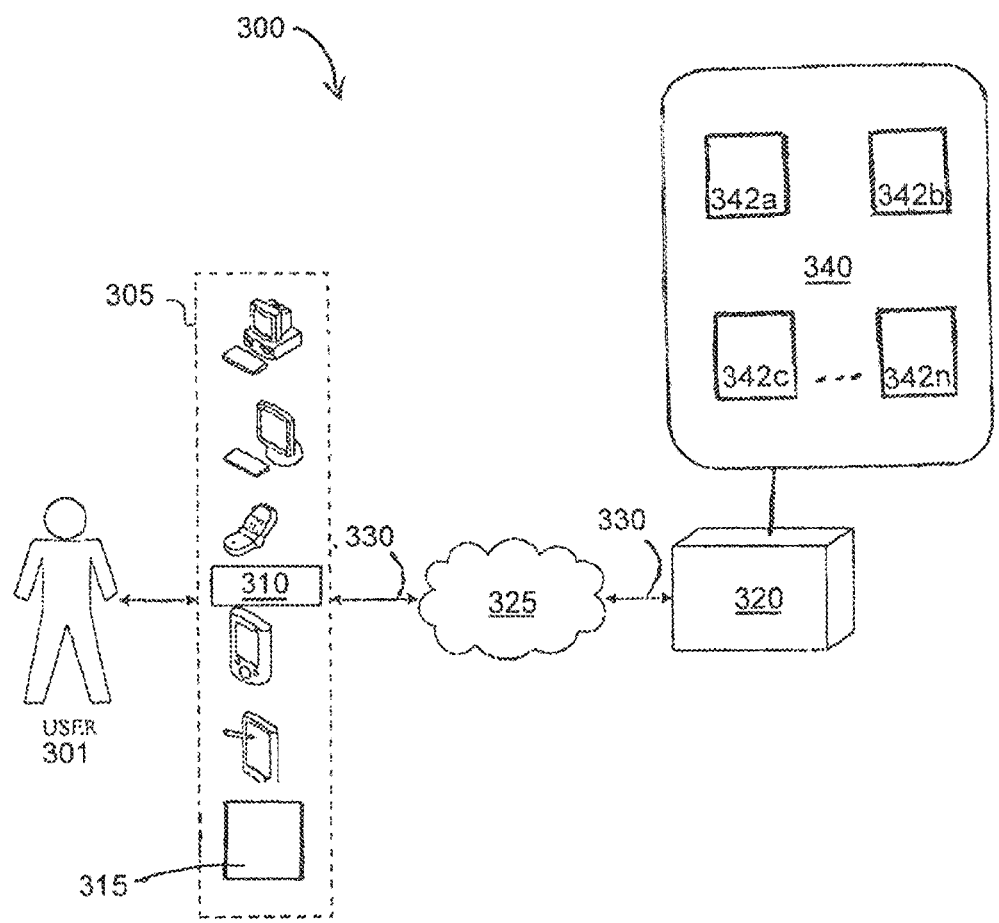
FIG. 3 shows a block diagram of an embodiment of a system for remotely operating a switch.

FIG. 3 is a simplified block diagram of an embodiment of a system 300 for remotely operating a switch for use by a user 301. System 300 includes one or more user computing devices 305, and a server 320, coupled to a communication network 325 via a plurality of communication links 330. Computing device 305 may be used to run a user application 310 for remotely operating a switch. User application 310 may use computing device 305 and network 325 to access server 320. Communication network 325 (or "network 325") provides a mechanism for allowing the various components of system 300 to communicate and exchange information with each other via communication links 330. Server 320 may run a switching control component 340, which itself may be comprised of sub-components, e.g., 342a, 342b, 342c, . . . , 342n. Sub-components 342a . . . 342n may include one or more databases. And computing device 305 may itself run an organizational managing component 315, which may perform as switching control component 340, or as one of sub-components 342a, 342b, 342c, . . . , 342n in communication with server 320 through network 325. Typically, disclosure directed to "communicating with, accessing, or interacting with" the server should be interpreted as "communicating with, accessing, or interacting with" the switching control component running on the server.

Network 325 may be any suitable communications network. Communication network 325 may itself be comprised of many interconnected computer systems and communication links. As an example, and not by way of limitation, one or more portions of network 325 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another suitable network, or a combination of two or more of these. Network 325 may include one or more networks 325.

Connections 330 may connect computing device 305 and server 320 to communication network 325 or to each other. Communication links 330 may be hardwire links, optical links, satellite or other wireless communications links, wave propagation links, or any other mechanisms for communication of information. This disclosure contemplates any suitable connections 325. In particular embodiments, one or more connections 325 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 330 each include an ad hoc network, an intranet, an extranet, a VPN, a LAN, a WLAN, a WAN, a WWAN, a MAN, a portion of the Internet, a portion of the PSTN, a cellular telephone network, another suitable connection 330, or a combination of two or more such connections 330. Connections 330 need not necessarily be the same throughout system 300. One or more first connections 330 may differ in one or more respects from one or more second connections 330.

Server 320 may be a network-addressable computing system that can host one or more switching control components 340. Server 320 may be responsible for receiving information requests from computing device 305 via user application 310, for performing the processing required to satisfy the requests, for generating responses to received inquiries, and for forwarding the results corresponding to the requests back to requesting computing device 305. Server 320 may store, receive, or transmit data and software, and information associated with the data and software (including user data). The processing required to satisfy the requests may be performed by server 320 or may alternatively be delegated to other servers connected to communication network 325. For example, other servers may host switching control component 340, or sub-components 342a . . . 342n. Server 320 may be an intermediary in communications between a computing device 305 and another server system, or a computing device 305 may communicate directly with another server system. Server 320 may be accessed by the other components of system 300, for example, directly or via network 325. In particular embodiments, one or more users 301 may use one or more computer devices 305 to access, send data to, and receive data from server 320.

Computing device 305, connections 330, and network 325, enable user 301 to access and query information stored and applications run by server 320, such as switching control component 340. Some example computer devices 305 include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®.

In an embodiment, user application 310 may be run or executed by a different system. For example, computing device 305, or server 320, or both, may run user application 310. That is, user application 310 may be run by computing device 305, or the application may be run on server 320 and accessed by computing device 305 through a browser and network 325. For example, computing device 305 could be operated as a terminal, with user application 310 being run on a server, e.g., server 320. In an embodiment, aspects or functionalities of user application 310 are run by server 320, or another computing system or server. In an embodiment, the steps of the methods described herein may be performed, at least in part, in cloud-computing environment.

FIG. 3 illustrates a particular arrangement of user 301, computing device 305, and server 320, but this is an example arrangement. Any other suitable arrangement of user 301, computing device 305, server 320, and network 325 may be used. For example, computing device 305 may be connected directly to server 320. Also, computing device 305 and server 320 may appear to be distinct yet operate on the same hardware. In addition, any number of users 301, clients 305, and server 320 may be used in embodiments.

Figure 4:
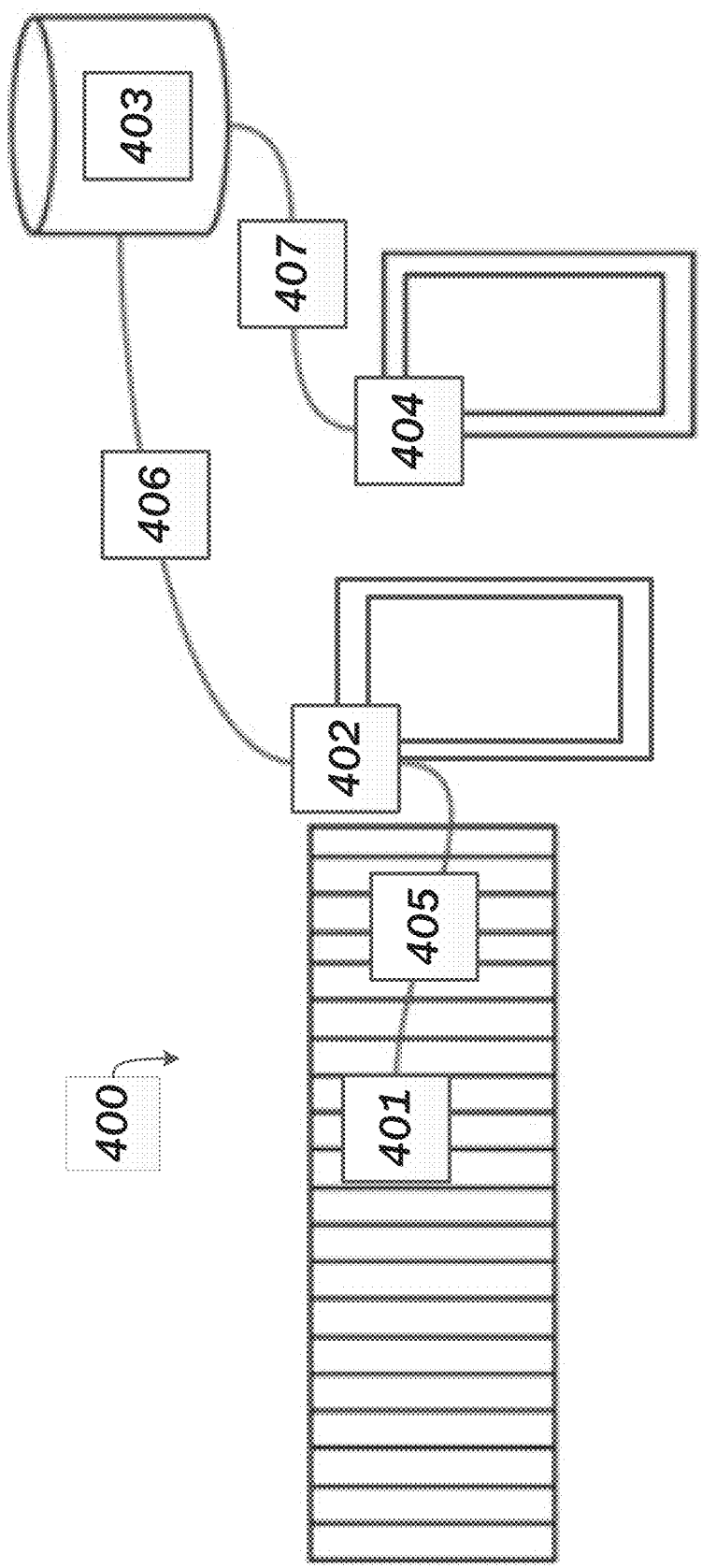
FIG. 4 shows a simplified block diagram of an embodiment of a system for remotely operating a switch.

FIG. 4. illustrates an embodiment of a system 400 for remotely operating a switch. In the embodiment of FIG. 4, a switch-operated device, such as a gate 401, is connected to a switching device 402 by a connection 405, which may be, e.g., wired or wireless. In the embodiment, the exemplary device, gate 401, is an electrically operated gate that opens or closes depending on the state dictated by the switching device 402. In the embodiment, switching device 402 includes a network-enabled device that may close a switching circuit based on commands received over a network 406. For example, switching device 402 may include a network-enabled device that is enabled to connect to network 406, as described with reference to the devices and networks of FIGS. 1-3. Switching device 402 is connected by network 406 to a server 403. Server 403 may run a switching control component such as component 340 (FIG. 3) and may send commands to switching device 402 over network 406. Server 403 may receive information, such as switching commands, set-up information, guest user information, user privilege level information, from a user device 404. User device 404 (e.g., computing devices 200, 305, and client devices 105, 110, 115, 305 (FIGS. 1-3)) may communicate with server 403 over a network 407, which may be the same network as network 406, or another network, as described with reference to FIGS. 1-3.

Additional user devices 404 (not shown) may also communicate with server 403 over network 407. Additional user devices 404 may all have the same access privileges, or additional user devices 404 may have different access privileges. For example, two user devices 404 may have the same privileges (e.g., one user device 404 may be a "spare" of a second user device 404). Also, for example, one user device 404 may be a primary, or owner, user device with unlimited, primary, or "owner" privileges and a second user device 404 may be a secondary, or "guest," user device with limited or "guest" privileges.

In an embodiment, a user may interface with server 403 using user device 404 running a user interface (not shown). The user interface may reflect whether the user has primary or "owner" privileges or the user has secondary or "guest" privileges. For example, where the user has primary privileges, a list of primary features may be available and the primary user may be able to use (e.g., view, access, customize, etc.) each of the primary features. On the other hand, where the user has secondary privileges, the secondary user may be able to use a subset (or modified subset) of the primary features.

Gate 401 is just an example of the devices that may be controlled by embodiments. Embodiments are envisioned that may control other electronically activated systems, such as an apartment door buzzer, or a manned access point (e.g., a manned gate at the entrance to a gated community). In an embodiment, gate 401 may be swung open or closed depending on the state of switching device conveyed to gate 401 over connection 405. In an embodiment, gate 401 may be driven sideways to open or close d by sideways depending on the state of switching device conveyed to gate 401 over connection 405. In an embodiment, gate 401 may be replaced by another type of barrier, such as, e.g., a garage door that is raised or lowered, or a standard door. In an embodiment, gate 401 may be opened and closed in another fashion, e.g., by being raised and lowered. In embodiments, user device 404 may be, e.g., a mobile device, or other network-enabled client device 105, 110, 115 (FIG. 1). Networks 406, 407 may use standard internet protocols that can be wired, Wi-Fi, cellular, or other networks referenced in regard to FIGS. 1-3, or combinations of these.

In an embodiment, switching device 402 incorporates a computing device with an operating system. The incorporated computing device may itself be a network-enabled device or may be in addition to a network-enabled device included in switching device 402. The inclusion of the operating system is one feature that enables using a decentralized server between the gate 401 and the user device 404.

In embodiments, control of the switching device has been decentralized by using a server and one or more networks. The server may then be used to communicate commands to the switching device. This enables continuously monitoring the switching device's availability to the server. It also enables updating of server and switching device software, e.g., updating to enhance features or provide additional features, updating to patch security holes, etc. Embodiments allow the server to be exposed to users through online browsers or other network access. With such access, embodiment features and services may be implemented and enhanced to address the user needs. It is anticipated that updates to the switching device would mainly involve security patches and drivers (new or updated) for peripherals, and that updates related to other system features would be made to the server software and application. However, such anticipated updates should not be understood to limit the potential of embodiments to update all aspects of the software of switching devices, server, and user devices.

In an embodiment, one or more cameras may be connected to the switching device. The ability to update the software on both the server, user device, and the switching device allows for updating camera support as new options become available.

One or more embodiments provide the following features, which are enabled or enhanced by networking the switching device and user devices with the server: the ability to constantly monitor the device function and connection; the ability to have a centralized logging function; the ability to share an access point with many users; a reduced need for firmware updates, since all connected devices may be monitored, their software determined, and then updated when and as needed; the ability to update the user interface and other software when and as needed; support for peripheral devices, such as lights, cameras, motion sensors, etc.; the ability to remotely use the system over a cellular connection; a reduced need for bandwidth over all connection types; the ability to decouple the user interface from the switching device to support things such as time zones and languages; a reduced code base in the "wild," which makes the system more secure; the ability to schedule switching times; and the ability to integrate with external services (e.g., UPS, Lyft, Uber, Postmates).

Regarding a reduced code base in the "wild" making the system more secure, in an embodiment, though there is considerable code running on the switching control device, the amount of code that is under the control of the system is much reduced—to approximately 1% of the code estimated to be controlled by a known competitor. In the embodiment, the operating system may be an industry standard such as Debian GNU/Linux or Ubuntu. With such operating systems the patching and maintenance is provided by the community. This reduces dramatically the code that is unique to the switching control device itself. The communities involved in maintaining the industry standard operating systems are constantly patching security holes and adding peripheral drivers. Thus, embodiments benefit from this activity and unique system updates can be focused primarily on ensuring the server is secure (which itself may be facilitated by having the server in a secure environment).

Regarding a reduced need for bandwidth, in an embodiment the reduced need results from transmitting simple commands over the network rather than transmitting an entire user interface. This reduces the overhead of data usage. In an embodiment, for a gate with hundreds of users and hundreds of gate opens a day, including an update ping every few seconds to the server to make sure the connectivity is still active, the embodiment is estimated to use approximately 50 MB of data a month.

Regarding the ability to integrate with external services, in an embodiment, the external service may be given an access code that allows the service to access a place, such as a house, a gated community, a room, etc. Limitations may be placed on the access privileges in the sense that the access code may be conditionally valid. For example, access privileges may be permanent until surrendered by the service, permanent until revoked by the user, limited in duration, limited to specific time windows, or limited in usage, such as being limited to be used (e.g., allowing access) a predetermined number of times. Access privileges may be limited by combinations of limitations or conditions, as well. For example, in an embodiment an access code may be valid: for a one-time use (e.g., for a delivery); during a particular time of the day (e.g., for a regular delivery); for a duration (e.g., for a visiting guest).

In embodiments, an access may be accepted when the access code is "valid" and not accepted when the access code is "invalid," with the validity or invalidity being determined by limitations or conditions placed on access privileges. In other embodiments, an access code may be valid but accepted or not accepted depending on limitations or conditions placed on access privileges. For example, an access code may be valid to open a particular gate provided no other access code has been used for that particular gate on that particular day. Such a feature would allow first-come, first-served privileges.

Figure 5:
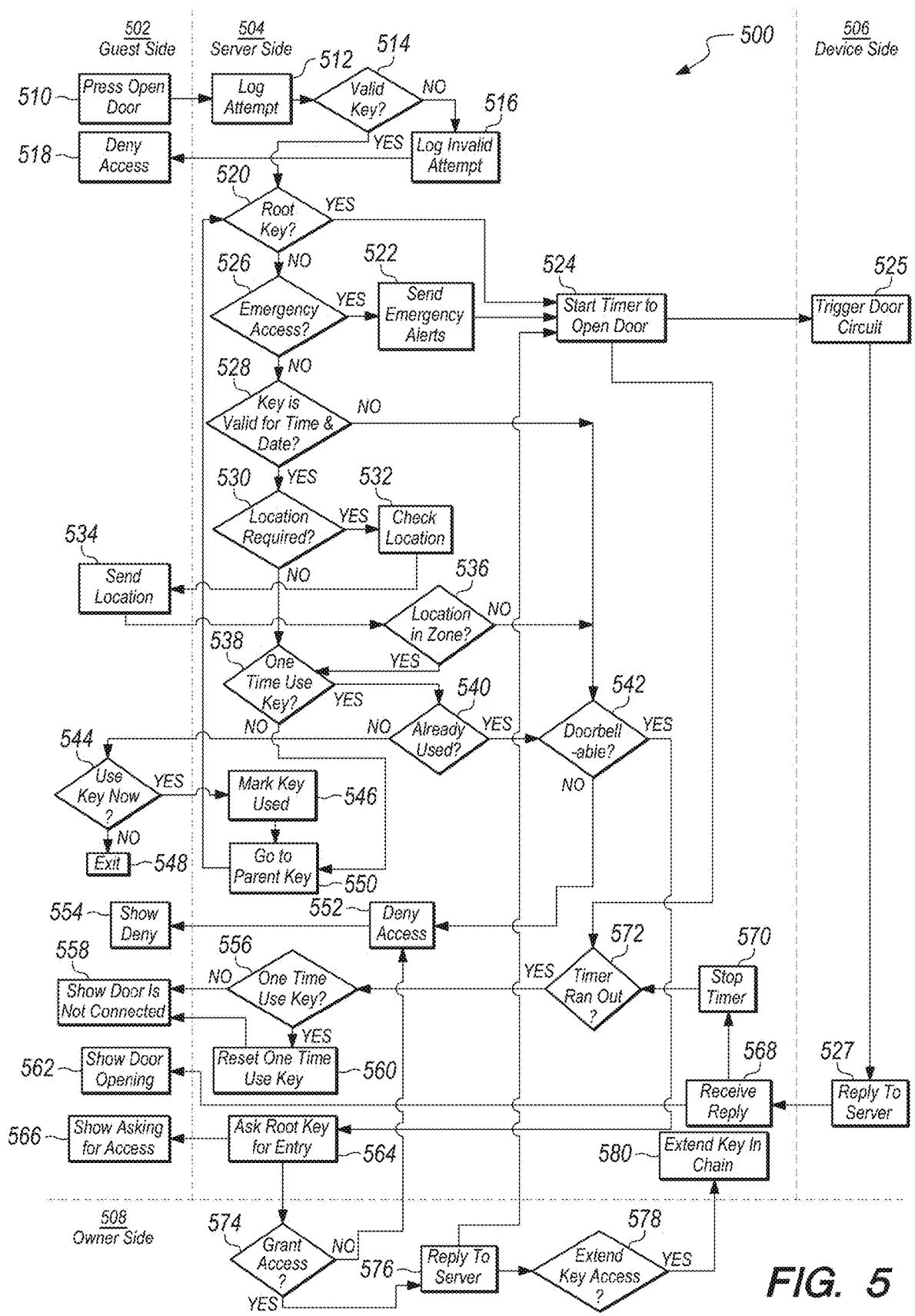
FIG. 5 is a flow chart of an embodiment of a method for remotely operating a switch.

FIG. 5 is a flow chart of an embodiment of a method 500 for remotely operating a switch. In FIG. 5, method 500 involves a guest side 502, a server side 504, a device side 506 and an owner side 508. Guest side 502 generally involves steps performed by a guest or that affect the guest, where a guest (or guest user) is a guest user of a switching device and associated switch-operable device (e.g., switching device 402 (FIG. 4) and gate 401 (FIG. 4), respectively). The guest may interface with the system using a user device (such as user device 404 (FIG. 4)). Server side 504 generally involves steps performed by a server (e.g., server 403 (FIG. 4)). Device side 506 generally involves steps performed by a switching device (e.g., switching device 402 (FIG. 4). And owner side 508 generally involves steps performed by an owner or that affect the owner, where an owner (or owner-user) is the owner (or is otherwise in control of) the switching device and associated switch-operable device (e.g., switching device 402 (FIG. 4) and switch-operated device 401 (FIG. 4), respectively).

In the embodiment, the method is applied to an exemplary system controlling a door (similar to gate 401 (FIG. 4)).

In step 510 of method 500, a guest presses "open door" on a user interface of a user device in an attempt to open the door. The attempt also provides information regarding the particular door and a key. The key may be, e.g., a code input by the guest, but may not be a code, per se. Rather, a key may be information that identifies the "presser" (guest) or the key or both. Such information may include a universally unique identifier (UUID). Such information may include a photo identification. Such information may include biometric data, e.g., a fingerprint or facial scan. The guest may be known or unknown. If the guest is known then the method may determine the guest's identity as described within. However, with certain special use keys, such as a party key, any possessor of the key may use the key (e.g., open the relevant gate or door) as long as the use is within the time limits or other conditions controlling use of the key. In step 512, the server logs the attempt. In step 514, the server determines whether a valid key was presented. For example, the server may use the provided code and door information and determine whether that particular code is valid for that particular door. The server may determine such validity using a database to which the server has access. If the key is not valid, in step 516 the server logs the invalid attempt and in step 518, the guest is denied access.

Returning to step 514, if the key is valid then in step 520 the server determines whether the key is a root key. A root key is a master key in the chain of trust (or a chain of "priority"). This compares to a "parent key," which refers to a key directly "above" a key in question in the chain of trust. For example, a homeowner may issue a gate key to the landscaper. The homeowner may give the landscaper the ability to issue keys to his crew. If a crew member tries to open the gate, the landscaper is the parent key and the homeowner is the root key. If the presented key is not a root key, then in step 526 (an optional step) the server determines whether the attempt is an attempt at emergency access. If not an emergency access (or if optional step 526 is not included), then in step 528 the server determines whether the key is valid for the date and time the key was presented. If the key is not valid for the time and date, in step 542 the server determines whether the attempt is "doorbell-able" (i.e., the particular door may also be opened by the owner). If the door is not doorbell-able, then in step 552 access is denied and in step 554 the denial is displayed to the guest.

Returning to step 520, if the presented key is a root key, then in step 524 a command is sent to the device to open the door and a "door-open" timer is started. In step 525, the switching device receives the command and triggers the door circuit, causing the door to open (or to be unlocked and "open-able," depending on the mechanical configuration). In step 527, the switching device replies to the server that the command was received and the door is being opened. In step 568, which may occur if the timer has not run out, the server receives the "door is opening" status and communicates that status to the guest device. In step 562, the guest device displays a message that the door is opening.

In step 568, the server receives the "door is opening" status and also, in step 570, stops the timer. In step 572, the server determines that the timer ran out or receives the information that the timer was stopped, proceeding on the "yes" path to step 556 only if the timer ran out (see step 524). In step 556, after the timer ran out, the server determines whether the presented key was a one-time use key. If not, then in step 558, a message is displayed showing the guest that the door is "not connected," which means that the time has expired during which the door could open. If in step 556 the presented key was a one-time use key, then in step 560 the one-time use key is "reset," which means that the presented key, having been presented once, but not used because the timer ran out, is reset so it may be presented again. In step 558, the message is displayed showing the guest that the door is "not connected."

Returning to step 526, if the server determines that the attempt is an attempt at emergency access, then in step 522 the server sends emergency alerts and proceeds to step 524. Emergency alerts may include, for example, messages to: the owner, the fire-department, and the police department.

Returning to step 528, if the presented key is determined to be valid for the date and time presented, then in step 530 the server determines whether a location is required. If not, then in step 538, the server determines whether the presented key was a one-time use key. If not, then in step 550, the server "goes to the parent key" and returns to step 520.

Regarding "goes to the parent key," since keys are hierarchical, at a certain point the method returns to the root key to determine whether to trigger the door circuit. For example, take A as the root key, B as the gardener's key, and C as the gardener's worker's key. If the gardener's worker tries to gain access the method would first check key C, then if it passes, the method 'goes to the parent key' and checks the B key. If the B key passes the method checks the A key. The A key, being a root key, would eventually trigger the door circuit. This part of the method allows for access in which, if you revoke the gardener's key (a parent key), you don't have to revoke all the gardener's worker's keys ("sub-parent" keys, or "child" keys), since they are a level down in the chain of trust. The method also benefits an HOA—if someone were to move out of their house, that property's root keys may be revoked which would then revoke all access those root keys gave to anyone else.

Returning to step 530, if the server determines a location is required, then in step 532 the server sends a request for location information to the guest. In step 534, the guest sends location information to the server. In an embodiment, the information in step 534 may be entered by the guest user. In an embodiment, the information in step 534 may be determined by the guest user's device. In step 536, the server determines whether the received location information is in a particular zone. If not, then in step 542 the server determines whether the attempt is "doorbell-able." If not, the server proceeds as discussed earlier regarding step 542. If the attempt is "doorbell-able," then in step 564 the server requests entry from the root key, sending information regarding the request to guest side 502 and owner side 508. In the guest side, in step 566, the request for entry from the root key is displayed to the guest by the guest device. In the owner side, in step 574, the request to grant access is displayed to the owner-user. If the owner-user refuses to grant access, the refusal is communicated to the server and in step 552, the server denies access as discussed previously.

Regarding the "zone" of step 536, a zone may be set by the user in a "door configuration" step or interface. For example, the user could set the zone so that certain other users must be within a block (geographic area), or a half mile (distance from the door), or another arbitrary, user-defined area. In an embodiment, a user with appropriate privileges may set the zone as an area on a map. The zone may be modified or configured at any time by the user.

Returning to step 574, if the owner-user grants access, then in step 576 the grant is sent to the server, which processes the grant of access in step 524 as discussed previously. After step 576, in step 578 the owner-user is asked whether to extend key access. If so, the owner-user's choice to extend key access is communicated to the server. In step 580, the server extends the presented key in the chain.

In an embodiment, a key may be "extended" by making the key valid for the next X amount of time. The X amount may be measured by the hour, day, week, etc. Such "extending" essentially converts the key into a family key for that X amount of time. For example, if a guest is staying at a user's home for the next two days. The first time the guest "doorbells" the user, the user may open the door. The user may then "extend" the guest (or the guest's device), granting the guest access for the next two days, during which time the guest may use their device to trigger the door circuit directly, without having to "doorbell" the user. This gives the guest family access without having to go through a lot of steps.

Returning to step 536, if the server determines that the received location is in a particular zone, then in step 538, the server determines whether the presented key is a one-time use key. If not, the server processes the request as discussed previously regarding step 538. If the server determines that the presented key is a one-time use key, then in step 540, the server determines whether the presented one-time use key has already been used. If not, then in step 544 the server asks the guest whether to use the presented one-time use key at this time. If the guest responds that the presented one-time use key should not be used at this time, then in step 548 the process is exited.

Returning to step 540, if the server determines that the presented one-time use key has already been used, then in step 542 the server determines whether the attempted access is "doorbell-able" as discussed previously.

Returning to step 544, if the guest responds that the presented one-time use key should be used at this time, then in step 546 the server marks the presented key as being used and, in step 550 the server "goes to the parent key" as discussed previously.

Figure 6:
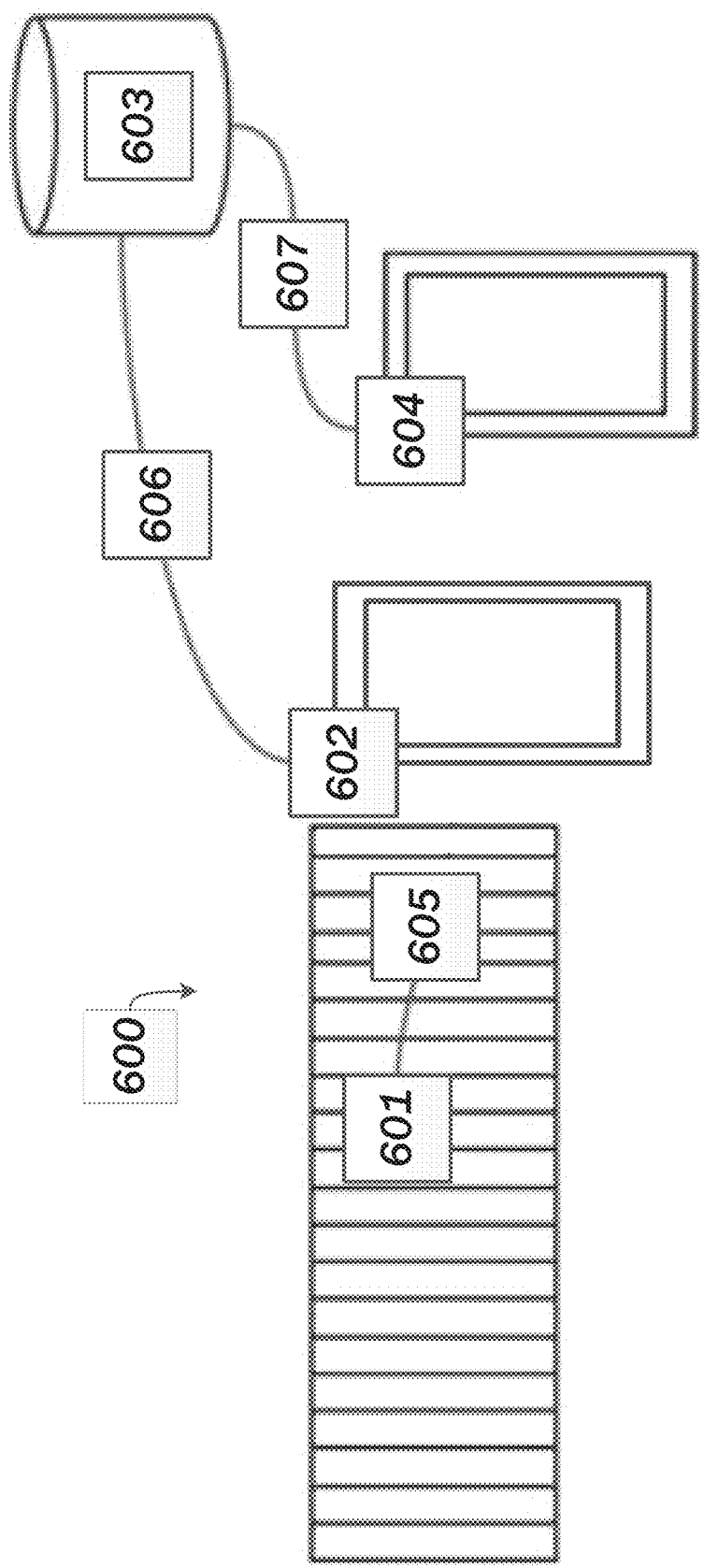
FIG. 6 shows a simplified block diagram of an embodiment of a system for remotely directing the operation of a switch.

FIG. 6 shows a simplified block diagram of an embodiment of a system 600 for remotely directing the operation of a switch 605. In the embodiment, a gate 601 may be operated by an operator (e.g., a guard (not shown)) who has control of a switch 605, which opens or closes gate 601 via a wired or wireless connection. In the embodiment, a network enabled directing device 602 is programmed to provide information directing the actions of the operator as to whether gate 601 should be opened, remain closed, or be closed. In the embodiment, the provided information is determined by one or more software components running on a server 603 based on the potential guest presenting information, such as a code or key, to server 603 using a client device 604. For example, the provided information could indicate whether the potential guest (who just pushed a button on their device 604) has been granted access. Directing device 602 may include a user interface for a client device (e.g., client devices 105, 110, or 115 (FIG. 1)), or something more basic, such as a light system that indicates the appropriate state for gate 601.

In an embodiment, a user interface may include an application that informs the gate operator whether to open the gate, or not, i.e., whether the potential guest has been granted access. The application may be web-based, or dedicated, and the client device displaying the application may be the operator's own mobile device. In an embodiment, the user interface may direct the gate operator to follow a procedure in addition to, or instead of, simply opening, not opening, or closing the gate. In an embodiment, the procedure may include an emergency procedure that includes, e.g., alerting a specific user, such as an owner, or the authorities. In an embodiment, the application may store information regarding the guest and may provide that information to the gate operator. In an embodiment, the stored guest information may include, e.g., a scan of the guest's government-issued ID, a photo of their license plate and/or make, model and color of their vehicle. Embodiments contemplate the system being employed in both suburban and urban settings. For example, an urban setting may include the system providing information directing a doorman whether to admit a potential guest.

In the embodiment of FIG. 6, gate 601 is connected to a switch 605, which is under the control of an operator (not shown). In the embodiment, the exemplary device, gate 601, is an electrically operated gate that opens or closes depending on the state of switching device 605. In the embodiment, network enabled directing device 602 includes a display that indicates to the operator whether allow a potential guest access. Network enabled directing device 602 receives the information for display to the operator based on commands received over a network 606. For example, directing device 602 may include a network-enabled device that is enabled to connect to network 606, as described with reference to the devices and networks of FIGS. 1-3. Directing device 602 is connected by network 606 to a server 603. Server 603 may run a switching control component such as component 340 (FIG. 3) and may send commands to directing device 602 over network 606. Server 603 may receive information, such as switching commands, set-up information, guest user information, user privilege level information, from a user device 604. User device 604 (e.g., computing devices 200, 305, and client devices 105, 110, 115, 305 (FIGS. 1-3)) may communicate with server 603 over a network 607, which may be the same network as network 606, or another network, as described with reference to FIGS. 1-3.

Additional user devices 604 (not shown) may also communicate with server 603 over network 607. Additional user devices 604 may all have the same access privileges, or additional user devices 604 may have different access privileges. For example, two user devices 604 may have the same privileges (e.g., one user device 604 may be a "spare" of a second user device 604). Also, for example, one user device 604 may be a primary, or owner, user device with unlimited, primary, or "owner" privileges and a second user device 604 may be a secondary, or "guest," user device with limited or "guest" privileges.

In an embodiment, a user may interface with server 603 using user device 604 running a user interface (not shown). The user interface may reflect whether the user has primary or "owner" privileges or the user has secondary or "guest" privileges. For example, where the user has primary privileges, a list of primary features may be available and the primary user may be able to use (e.g., view, access, customize, etc.) each of the primary features. On the other hand, where the user has secondary privileges, the secondary user may be able to use a subset (or modified subset) of the primary features.

In an embodiment, an operator (not shown) may interface with server 603 using user directing device 602 running a user interface (not shown). The user interface may reflect whether the potential guest or user has primary or "owner" privileges or the user has secondary or "guest" privileges. For example, where the user has primary privileges, a list of primary features may be available and interface may indicate to the operator that the primary user may be able to use each of the primary features. Such primary features may include, e.g., special access privileges regarding times and dates, special privileges regarding the type of vehicle that may enter, and special privileges regarding how many vehicles may enter with one key or code. On the other hand, where the user has secondary privileges, server 603 may indicate to the operator through directing device 602 that the secondary user may be able to use a subset (or modified subset) of the primary features.

Gate 601 is just an example of the devices that may be controlled by embodiments. Embodiments are envisioned that may control other operator-manned activities or stations, such as an apartment door, a ticket-requiring entrance (e.g., movie, toll road, amusement park ride, and concert). User device 604 may be, e.g., a mobile device, or other network-enabled client device 105, 110, 115 (FIG. 1). Networks 606, 607 may use standard internet protocols that can be wired, Wi-Fi, cellular, or other networks referenced in regard to FIGS. 1-3, or combinations of these.

In an embodiment, directing device 602 incorporates a computing device with an operating system. The incorporated computing device may itself be a network-enabled device or may be in addition to a network-enabled device included in directing device 602. The inclusion of the operating system is one feature that enables using a decentralized server between gate 501 and the user device 504.

In the embodiment, control of directing device 602 has been decentralized by using a server and one or more networks. The server may then be used to communicate commands to the directing device. This enables continuously monitoring the directing device's availability to the server. It also enables updating of server and directing device software, e.g., updating to enhance features or provide additional features, updating to patch security holes, etc. Embodiments allow the server to be exposed to users through online browsers or other network access. With such access, embodiment features and services may be implemented and enhanced to address the user needs. It is anticipated that updates to the directing device would mainly involve security patches and drivers (new or updated) for peripherals, and that updates related to other system features would be made to the server software and application. However, such anticipated updates should not be understood to limit the potential of embodiments to update all aspects of the software of directing devices, server, and user devices.

In an embodiment, one or more cameras may be connected to the directing device. The ability to update the software on both the server and the directing device allows for updating camera support as new options become available.

One or more embodiments provide the following features, which are enabled or enhanced by networking the directing device with the server: the ability to constantly monitor the device function and connection; the ability to have a centralized logging function; the ability to share an access point with many users; a reduced need for firmware updates, since all connected devices may be monitored, their software determined, and then updated when and as needed; the ability to update the user interfaces and other software when and as needed; support for peripheral devices, such as lights, cameras, motion sensors, etc.; the ability to remotely use the system over a cellular connection; a reduced need for bandwidth over all connection types; the ability to decouple the user interface from the directing device to support things such as time zones and languages; a reduced code base in the "wild," which makes the system more secure; the ability to schedule switching times; and the ability to integrate with external services (e.g., UPS, Lyft, Uber, Postmates).

Figure 7:
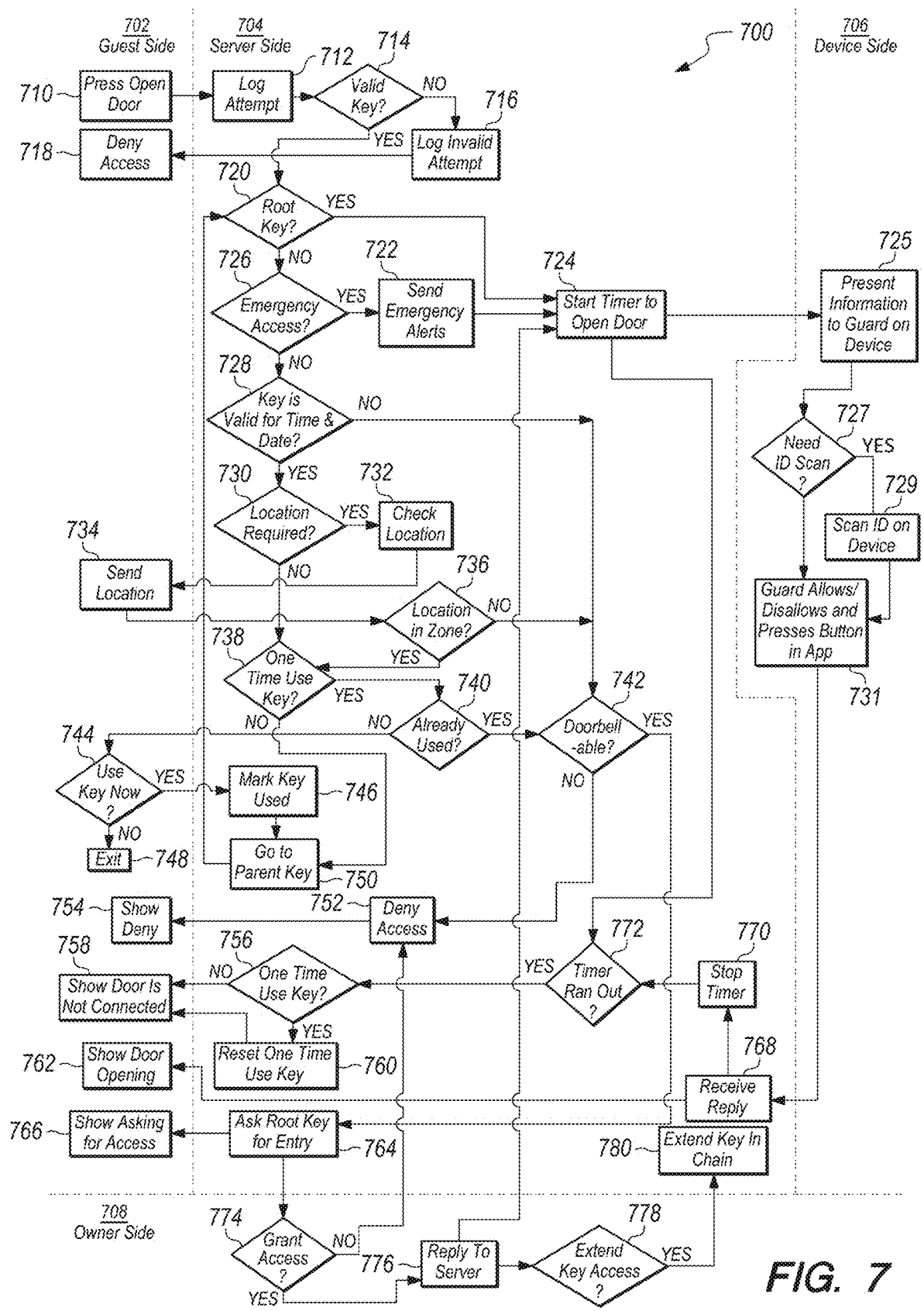
FIG. 7 is a flow chart of an embodiment of a method for remotely directing the operation of a switch.

FIG. 7 is a flow chart of an embodiment of a method 700 for remotely directing the operation of a switch (e.g., switch 605). In FIG. 7, method 700 involves a guest side 702, a server side 704, a device side 706, and an owner side 708. Method 700 is similar to method 500 (FIG. 5), differing primarily in the steps attributed to device side 706. In method 700, guest side 702 generally involves steps performed by a guest or that affect the guest, where whether to admit a potential guest (or guest user) is determined by the operator in possession of a directing device and in control of a switched device (e.g., directing device 602 (FIG. 6) and gate 601 (FIG. 6), respectively). The guest may interface with the system using a user device (such as user device 604 (FIG. 6)). Server side 704 generally involves steps performed by one or more software components running on a server (e.g., server 603 (FIG. 6)). Device side 706 generally involves steps performed by a directing device (e.g., directing device 602 (FIG. 6). And owner side 708 generally involves steps performed by an owner or that affect the owner, where an owner (or owner-user) is the owner (or is otherwise in ultimate control of) the directing device and associated switch-operable device (e.g., directing device 602 (FIG. 6) and switch-operated device (gate 601, FIG. 6), respectively).

In the embodiment, the method is applied to an exemplary system for directing the control of a door (e.g., gate 601 (FIG. 6)).

In step 710 of method 700, a guest presses "open door" on a user interface of a user device in an attempt to open the door. The attempt also provides information regarding the particular door and a key. The guest may be known or unknown. If the guest is known the method may determine the guest's identity as described within. However, with certain special use keys, such as a party key, any possessor of the key may use the key (e.g., direct the operator to open the relevant gate or door) as long as the use is within the time limits or other conditions controlling use of the key. In step 712, the server logs the attempt. In step 714, the server determines whether a valid key was presented. For example, the server may use the provided code and door information and determine whether that particular code is valid for that particular door. The server may determine such validity using a database to which the server has access. If the key is not valid, in step 716 the server logs the invalid attempt and in step 718, the operator is directed to deny the guest access.

Returning to step 714, if the key is valid then in step 720 the server determines whether the key is a root key. A root key is a master key in the chain of trust (or a chain of "priority"). This compares to a "parent key," which refers to a key directly "above" a key in question in the chain of trust. If the presented key is not a root key, then in step 726 (an optional step) the server determines whether the attempt is an attempt at emergency access. If not an emergency access (or if optional step 726 is not included), then in step 728 the server determines whether the key is valid for the date and time the key was presented. If the key is not valid for the time and date, in step 742 the server determines whether the attempt is "doorbell-able" (i.e., the operator of the particular door may also be directed by the owner to open the door). If the door is not doorbell-able, then in step 752 access is denied and in step 754 the denial is displayed to the both the guest and the operator on the respective devices.

Returning to step 720, if the presented key is a root key, then in step 724 a command is sent to the directing device informing the operator of the request to open the door and a "door-open" timer is started. In step 725, the directing device receives the command and indicates to the operator whether additional information is needed. In an optional step 727, the directing device indicates to the operator that a scan of an identification card is required. If a scan is required, in an optional step 729, the directing device indicates that the scan of the identification card is to be performed using the directing device. In step 731, based on the request to open the door from step 724 and also based on the results of any optional scan or identification verification step, the operator allows or disallows access, and indicates to the server using the directing device whether access was granted. In an optional step (not shown), the server receives an indication from the operator that access was disallowed and displays the denial of access to the guest user (as in step 754). In step 768, which may occur if the timer has not run out, the server receives a "door was allowed to open" status and communicates that status to the guest device. In step 762, the guest device displays a message that the door will be opened (or is "open-able" depending on the mechanical configuration).

In step 768, the server receives the "door will be opened" status and also, in step 770, stops the timer. In step 772, the server determines that the timer ran out or receives the information that the timer was stopped, proceeding on the "yes" path to step 756 only if the timer ran out (see step 724). In step 756, after the timer ran out, the server determines whether the presented key was a one-time use key. If not, then in step 758, a message is displayed showing the guest that the door is "not connected," which means that the time has expired during which the door could open. If in step 756 the presented key was a one-time use key, then in step 760 the one-time use key is "reset," which means that the presented key, having been presented once, but not used because the timer ran out, is reset so it may be presented again. In step 758, the message is displayed showing the guest that the door is "not connected."

Returning to optional step 726, if the server determines that the attempt is an attempt at emergency access, then in step 722 the server sends emergency alerts and proceeds to step 724. Emergency alerts may include, for example, messages to: the owner, the fire-department, and the police department.

Returning to step 728, if the presented key is determined to be valid for the date and time presented, then in step 730 the server determines whether a location is required. If not, then in step 738, the server determines whether the presented key was a one-time use key. If not, then in step 750, the server "goes to the parent key" (as discussed previously with respect to FIG. 5) and returns to step 720.

Returning to step 730, if the server determines a location is required, then in step 732 the server sends a request for location information to the guest. In step 734, the guest sends location information to the server. In an embodiment, the guest may enter the location information into the guest user's device. In an embodiment, the guest may send location information to the server in response to a request from the server. In an embodiment, the information in step 734 may be entered by the guest user. In an embodiment, the information in step 734 may be determined by the guest user's device. In an embodiment, the operator may enter the location information into the directing device in response to a request from the server.

In step 736, the server determines whether the received location information is in a particular zone. If not, then in step 742 the server determines whether the attempt is "doorbell-able." If not, the server proceeds as discussed earlier regarding step 742. If the attempt is "doorbell-able," then in step 764 the server requests entry from the root key, sending information regarding the request to guest side 702 and owner side 708. In the guest side, in step 766, the request for entry from the root key is displayed to the guest by the guest device. In the owner side, in step 774, the request to grant access is displayed to the owner-user. If the owner-user refuses to grant access, the refusal is communicated to the server and in step 752, the server denies access as discussed previously and the denial is communicated to the operator and the guest user.

Regarding the "zone" of step 736, a zone may be set by the user in a "door configuration" step or interface. For example, the user could set the zone so that certain other users must be within a block (geographic area), or a half mile (distance from the door), or another arbitrary, user-defined area. In an embodiment, a user with appropriate privileges may set the zone as an area on a map. The zone may be modified or configured at any time by the user.

Returning to step 774, if the owner-user grants access, then in step 776 the grant is sent to the server, which processes the grant of access in step 724 as discussed previously. After step 776, in step 778 the owner-user is asked whether to extend key access. If so, the owner-user's choice to extend key access is communicated to the server. In step 780, the server extends the presented key in the chain.

Returning to step 736, if the server determines that the received location is in a particular zone, then in step 738, the server determines whether the presented key is a one-time use key. If not, the server processes the request as discussed previously regarding step 738. If the server determines that the presented key is a one-time use key, then in step 740, the server determines whether the presented one-time use key has already been used. If not, then in step 744 the server asks the guest whether to use the presented one-time use key at this time. If the guest responds that the presented one-time use key should not be used at this time, then in step 748 the process is exited.

Returning to step 740, if the server determines that the presented one-time use key has already been used, then in step 742 the server determines whether the attempted access is "doorbell-able" as discussed previously.

Returning to step 744, if the guest responds that the presented one-time use key should be used at this time, then in step 746 the server marks the presented key as being used and, in step 750 the server "goes to the parent key" as discussed previously.

In an embodiment, the systems of FIG. 4 and FIG. 6 may be combined. For example, a community with both automated gates (according to FIG. 4) and manned gates (according to FIG. 6) may provide a single key or code and respond to the presented key or code according to whether it is presented to an automated gate (according to, e.g., method 500) or presented at a manned gate (according to, e.g., method 700).

An embodiment provides for automated entry. With this feature, a gate may be opened by another computing device, rather than a person. In the embodiment, a keyholder may grant access to the device. For example, access could be granted to a self-driving vehicle or self-driving delivery vehicle. In an embodiment, an owner-user or other keyholder may grant access to a service rather than an individual or device. Such services could include self-driving car services and self-driving delivery services. With such self-driving service, the car would determine using positioning and mapping functions when it neared the gate. As it approached the gate, the car would then trigger the gate by accessing the automated entry feature over an available network—just as a human user might trigger the gate with a mobile device. In another automated entry embodiment, a service, like UPS, might be sent a key that allows for the delivery of a specific package. When the key is issued to UPS for that package the owner-user would have no way of knowing which driver would attempt to access the gate. But, once the key is used for the package, the key would be rendered invalid—UPS would no longer be able to use the key. In an embodiment, the key could be conveyed to the service using an automated Application Programming Interface (API). Other services, such as voice-controlled devices like Google Home, Amazon Alexa, or Apple Ski could activate a gate open. That is, such devices may be used to interface with servers 403, 603 as client devices 195, 110, 115 (FIG. 1). For example, such devices may be used to send keys to guest users, or be the device that is "doorbelled" when the system performs such an action. In these embodiments, restrictions on the key or code may be maintained as before and may prevent access as before.

In an embodiment, the systems and methods described may be integrated with other smart devices, e.g., Internet-of-things devices, to activate peripheral devices based on access to a gate being allowed or denied. For example, If This, Then That (IFTTT) integration would allow users to create macros that activate peripheral smart devices, such as external lights or recording devices, based on the allowance or denial of access.

The following paragraphs describe features of one or more embodiments.

Master key—Master key holders may access logs of all entries made or attempted that used keys issued in the master key holder's chain of trust. Master key holders may easily revoke any key "under" them (in the sense that the key is in the Master key holder's chain of trust). This is a particularly beneficial feature for home owner associations (HOAs), commercial office buildings and parks, and more. In an embodiment, a master key holder would not be able to issue another master key.

Administrator key—An embodiment defines an administrator key as the switching device owner, e.g., a landlord or HOA. The administrator key holder has sole authority to issue master keys to, e.g., tenants or homeowners. The administrator may revoke master keys. However, in an embodiment, the administrator would not typically issue regular keys (e.g., doorbell keys, party keys, etc.) and would not be able to revoke those keys that were issued by the master keys. If a master (which had a long chain of issued and valid keys underneath it) were to lose privileges, then revoking the master would also revoke all the child keys below it. Also, the administrator would not be able to see key logs of master keys or their children. In an embodiment, a master key holder would need to ask a holder of an administrator key to issue a second master key.

Multiple master keys—with this feature the server allows the owner-user of the switching device to issue keys that have master-key privileges. This is different from "standard" or "non-multiple" master keys, which may issue all key types except administrator keys and other master keys. In an embodiment, a master key that is issued from a multiple master key is considered to be a child of the multiple master key—it may be revoked by the multiple master key and it would be revoked if the multiple master key was revoked.

Doorbell Keys—with this feature, after a key expires, the recipient of that key may still click a link that would read "doorbell" instead of "open." In an embodiment, all keys that expire automatically become doorbell keys. As would be expected after a key expires, the switching device (e.g., gate, garage, lock, etc.) will not open. However, the server will send a notification to the lowest key on the chain of trust that still has access. The user of that key will get a notification and, depending on the permissions or privileges granted to that user, may either allow access, deny access, or modify the key to allow further access. In an embodiment, all keys that expire automatically become doorbell keys after they expire.

Extended Doorbell key—with this feature, when the master key is "doorbelled" (i.e., notified by the server that access is being requested by the holder of an expired key), the holder of the master key has the option to extend the "doorbelling" key (e.g., for a day, week, etc.) so that the doorbell key returns to the key status it had before it expired to become a doorbell key. In an embodiment, the master key may also provide the extended doorbell key with additional meta-info at that time the key is extended.

Service Keys—a key holder who has permission for key creation may create a key that has access restricted by any combination of conditions, such as location, time of day, day of week, number of hours/days/months going forward, and number of uses.

Family Keys—a master key holder may create a family key. A family key may have an expiration date, or may be non-expiring. In addition, the key may have special features. For example, a family key may have the feature that when the family key is used after a child's curfew, the gate opens and the server notifies the master key.

Friend Keys—A friend key may be valid for a given time and then expire to become a doorbell key. For example, a friend key may be given access for a day and then revert to a doorbell key. This may happen many times. In an embodiment, a friend key (and a doorbell key) may provide extra information that is configurable before and after accepted entry. For example, people in a user's "friends" list may see the user's address and extra pre-entry meta-information. Pre-entry meta-information may include things such as the best place for an Uber or Lyft dropoff, a picture or description of the building, etc. The meta-information may also provide post-entry information such as a Wi-Fi name and password, or instructions (e.g., not to let the dog out when the gate opens or other such information). In an embodiment, when a friend key reverts to a doorbell key, the extra information of the friend key is deleted from the doorbell key.

Single-use Keys—a single-use key grants the user access only once. It is the type of key one might issue to an unknown entity, for example, a plumber who needs access for an emergency. A single-use key may expire after one use and revert to being a doorbell key.

Party Keys—master keys with this feature may create a party key, which is tied to an event rather than to a particular person. A party key may be shared freely by anyone who has the key and will expire after the event. In an embodiment, a master key may share this feature with child keys created by the master.

Sub-key Creation—with this feature, when permitted by the issuer of the key, a key holder may create a sub-key for others, creating a parent/sub-key relationship. Sub-keys are limited by any restrictions of the parent key holder. The parent key holder may add further restrictions to the sub-key, so that sub-keys may be more restricted, but never less restricted, than the parent key.

Remote Key Creation—with this feature, when permitted by the issuer of the key, a key holder may create and share a key with anyone connected by network to the key holder. The network over which the key is shared need not be the same network the switching device is connected to. For example, a key holder could share a key to a key receiver over a first network. The key receiver could accept the key over the first network, then connect to the relevant switching device and use the shared key on a second network.

In an embodiment, sharing a key also shares encapsulated metadata for the gate(s) that key controls. This removes the need for an extra or parallel step where such information is shared with the recipient of the key.

Key Revocation—with this feature, a master key has the right to revoke any keys in its chain of trust. This feature is available where the master key holder may access the internet. Also with this feature, a parent key may revoke any or all sub-keys (children keys) in the parent key's chain of trust.

Remote Open—this feature allows the gate to be operated from anywhere the user has an internet or other network connection with the server. This feature may be associated with a key (and subject to the key's privileges and limitations) and it may also be a stand-alone feature accessed by a user though a user device communicating with the server. In such situations, access to the server may be password-protected.

Bonding a Key to a Mobile Device—this feature provides the ability to limit key sharing by linking a particular key to a particular user device, for example, the first user device the key is used on. For example, a guest user may be sent a key and the key is bonded to the guest user's mobile phone, either with or without the user's permission. When a key is bonded to a particular device, if the device user wants to share access, the user must either have the right to create a new key, or must go up the chain of trust and request that a new key be created. With a bonded key, before the system grants access the system will check if the bonded key has been used before and if so, whether the present user of the key is using the key on the previously bonded device. If a user were to share a bonded key with someone else (after the key had bonded to the user's device), then the shared, bonded key would not be granted access and the parent would be notified. In an embodiment, the feature will warn the user before the first use of the key that the key will be bonded to the particular device being used. In an embodiment, the feature will allow the first user to specify that the bonded key may only be bonded to the guest device to which the bonded key was sent, e.g., the guest mobile phone with the telephone number to which the bonded key was sent.

Textable Web Link Key—this feature provides the ability to send a web link that grants access by the receiving user opening the link and clicking the open button on the page. With this feature there is no need for the recipient to download an application or log in to an account.

Emergency Access—this feature is optional and allows a particular key holder (e.g., a friend or neighbor) to be granted access even after a "doorbell" attempt fails. When this feature is used, notifications to related master and parent keys may be made more robust or emphatic. Also, the granted access may be logged as an emergency, which itself may prompt the logging of additional details and information regarding the access (e.g., audio files created by a microphone associated with the switching device). The feature provides for circumstances in which the owner-user might want to grant access to a trusted person without advance notice.

Smartphone System Notifications on Open—with the installation of an application on a smartphone, this feature provides a system notification on your smartphone of a switch being activated (e.g., a gate being opened) or a doorbell request being made by an expired key holder. This may be in addition to or instead of the user device receiving a text or email regarding the event.

Linking Multiple Devices to One Key—this feature allows for multiple switching devices to be linked to one key (e.g., a master key) and for multiple switching devices to be linked to one key for a particular use case. For example, a user may want to link a property gate and a garage together so that a single key may allow access to both the gate and garage. In an embodiment, the single key would be displayed on the user device with a button for each of the switching devices that were accessible using the single key (e.g., a "gate" button and a "garage" button).

Logging of Entries—with this feature a user with viewing privileges is provided with remote access to detailed logs of entries and entry attempts.

Friends List—with this feature the user application will allow the user to access a locally stored contacts list for easier sharing a key created by the user.

WiFi Connection—with this feature the switching device may connect to the internet through a local WiFi connection.

Ethernet Connection—with this feature the switching device may connect to the internet through a wired Ethernet connection.

Cellular Connection—with this feature the switching device may connect to the internet through a cellular connection.

Centralized control—with this feature some or all of the features will reside with the server and application, allowing such features to be easily updated.

Easy Security Patching—this feature is beneficial given the present potential for IoT hacking. With switching devices connected to the server, software updates such as security patches may be pushed as needed. In comparison, if a switching device is connected to an ad-hoc or local network (and not connected to the system server), the switching device would be difficult to update, particularly en masse with other switching devices.

Fail-over Connection—with this feature, if the switching device may connect to the internet through more than one connection method (e.g., a primary connection and a secondary connection), it may fail-over—it may switch to the secondary connection in the event the primary connection is lost.

Geo-fenced Notifications—this feature would allow the mobile device to notify a user that when a switching device (e.g., a gate) that the user may access comes into range. This feature allows for 1-step access. With 1-step access, when an accessible gate comes in range, the user application on the user device is activated. The user then only needs to press the "open" button for access, instead of having to find the application on the user device, open the user application, and then press "open."

Geo-fenced Access Control—this feature prevents a switching device (e.g., a gate) from activating unless the user (e.g., the user device) is within a certain distance from the switching device. This feature is active when the key holder does not have remote open privileges.

Continuous Connection Monitoring—with this feature, because a networked server is used to facilitate communication between a user and the switching device, that server may constantly monitor its connection with the switching device and monitor the switching device and notify the user if the connection or switching device fails. In comparison, if a switching device performs the function of allowing access (opening a gate) and also communicates directly with the user (e.g., directly to the user device using Bluetooth), then when the switching device fails the potential exists that the user may not be notified.

In an embodiment, a system for controlling a switch includes a switch, a network-enabled switch control device, and a network-enabled user device operable to send instructions to the switch control device over a network, the switch control device operable to control the state of the switch in response to instructions received over the network. In an embodiment, the network includes a server. In an embodiment, the server hosts a webpage operable to send instruction to the switch control device over the network. In an embodiment, an application installed on the user device and provides a user the ability to send instructions to the switch control device. An embodiment further includes a second application installed on the switch control device, the second application being operable to cause a display on the switch control device to display instructions to a security person posted at an access point. In an embodiment, the displayed instructions are received from the server in communication with the switch control device. In an embodiment, a webpage hosted by the server is operable to send instructions to the second application. In an embodiment, a first application installed on the user device provides a user the ability to send instructions to the second application.

In an embodiment, a method for controlling a switch includes: receiving, by a switch control component on a server, instructions from a user device; sending, by the switch control component on a server, the instructions to a switch control device, the instructions, when processed by the switch-control device causing the switch control device to change the state of a switch. In an embodiment, the switch control device has a set of features and a first user has a first priority, the first priority providing the first user the ability to control the set of features. In an embodiment, the first user has the ability to grant a second user the ability to control a sub-set of the set of features. In an embodiment, the first user has the ability to revoke the abilities granted to the second user and the ability to place conditions and limitations on the abilities granted to the second user. In an embodiment, the first user may grant the ability to control the sub-set of the set of features using: the user device; the switch control device; a webpage hosted by the server; a first application installed on the user device; or a second application installed on the switch control device. In an embodiment, the user device may be a mobile communications device or a computing device, and the user registers the user device with the server. In an embodiment, the ability to place conditions and limitations on the abilities granted to the second user includes the ability to limit the time the second user has the ability to control a sub-set of the set of features. In an embodiment, the conditions and limitations on the abilities granted to the second user include conditions and limitations that change based on the second user's proximity to the switch or switch control device. In an embodiment, the first user has an access point, the first user may be a home owners association, a business park, or an office building, and the second user may include a tenant or a homeowner. In an embodiment, the access point may include a gate or manned entry point. An embodiment further includes the switch control component monitoring the network availability or other status of one or more of the user device and the switch control device.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

We claim:

1. A method for authorizing the control of a barrier, the method comprising:
    receiving over a first network from a first user device associated with a first user, by a barrier control component on a server, a first key and a first request to provide a second key to a second user device associated with a second user that is not the first user, the first key being associated with a first set of abilities pertaining to the control of the barrier and pertaining to the providing of keys to additional user devices associated with users other than the first user, the first request asking that the second key be associated with a second set of abilities pertaining to the control of the barrier and pertaining to the providing of keys to additional user devices associated with users other than the second user, and the barrier being a barrier to an access of a physical space;

retrieving, by the barrier control component from a storage device, first information associated with the first key and pertaining to the first set of abilities;

determining, by the barrier control component from the first information, whether the first set of abilities includes:
an ability to provide the second key to the second user device, and
an ability to associate each of the second set of abilities with the second key; and when the determination indicates the first set of abilities includes the ability to provide the second key to the second user device and when the determination indicates the first set of abilities includes the ability to associate each of the second set of abilities with the second key:
storing, by the barrier control component in the storage device and associated with the second key, second information pertaining to the second set of abilities, and
providing, by the barrier control component to the second user device over a second network, the second key.

2. The method of claim 1, wherein the first network and the second network are the same network.

3. The method of claim 1, wherein the first key is further associated with a first access priority for controlling the opening of the barrier,
wherein the first request further asks that a second access priority for controlling the opening of the barrier be associated with the second key,
wherein the determining step further includes determining, by the barrier control component from the first information, whether the first set of abilities includes an ability to associate the second access priority with the second key, and
wherein the stored second information further includes information pertaining to the second access priority:
when the determination indicates the first set of abilities includes the ability to provide the second key to the second user device, when the determination indicates the first set of abilities includes the ability to associate each of the second set of abilities with the second key, and when the determination indicates that the first set of abilities includes the ability to associate the second access priority with the second key.

4. The method of claim 3, wherein the determining step further includes determining, by the barrier control component from the first information, that the first set of abilities includes the ability to provide another user only with an access priority that provides access that is equal to or less than the access provided by the first access priority, and wherein the stored second information includes the second access priority only when the second access priority provides access that is equal to or less than the access provided by the first access priority.

5. The method of claim 1, wherein the determining step further includes determining, by the barrier control component from the first information, that the first set of abilities includes the ability to provide another user only with abilities from the first set of abilities, and wherein the stored second information includes the second set of abilities only when each ability in the second set of abilities is also in the first set of abilities.

6. The method of claim 1, wherein the first set of abilities includes:
an ability to open the barrier;
an ability to provide a new key to the second user device;
an ability to provide an access priority to the second user device;
an ability to provide at least one ability to the second user device;
an ability to place a condition on an ability provided to the second user device; and
an ability to control a peripheral device associated with the barrier.

7. The method of claim 1 wherein the determining step further includes:
determining, by the barrier control component from the first information, that a first ability from the first set of abilities is subject to one or more conditions; and
determining, by the barrier control component from the first information, that the first user is authorized to associate the first ability with the second key only when the first ability as provided to the second user device is made subject to the one or more conditions, wherein the stored second information includes the first ability when the determination indicates the first set of abilities includes the ability to provide the second key to the second user device, when the determination indicates the first set of abilities includes the ability to associate each of the second set of abilities with the second key, and when the determination indicates that the first ability as provided to the second user device is made subject to the one or more conditions.

8. The method of claim 7, wherein the one or more conditions pertain to at least one of:
a number of times the ability may be exercised;
a duration of time after which the ability may not be exercised;
a time of day in which the ability may not be exercised; and
a day of the week in which the ability may not be exercised.

9. The method of claim 1, further comprising:
providing, by the barrier control component to the second user device, a list including the second set of abilities and any condition to which any ability of the second set of abilities is subject.

10. The method of claim 1, wherein the barrier control component receives the first request from the first user device after:
the first user device receives over the second network a second request from the second user device, the second request asking the first user to open the barrier; and
in response to the first request, the first user device is caused by the first user to send the second request to the barrier control component.

11. A system comprising:
a first user device;
a network-enabled switch;
a first network; and a server containing instructions which when executed cause the server to:

receive over the first network from the first user device, a first key and a first request from a first user to provide a second key to a second user device associated with a second user that is not the first user, the first key being associated with a first set of abilities pertaining to the control of the network-enabled switch and pertaining to the providing of keys to additional user devices associated with users other than the first user, the first request asking that the second key be associated with a second set of abilities pertaining to the control of the network-enabled switch and pertaining to the providing of keys to additional user devices associated with users other than the second user, and the switch controlling a barrier to an access of a physical space when connected to the barrier;

retrieve, from a storage device, first information associated with the first key and pertaining to the first set of abilities;

determine, from the first information, whether the first set of abilities includes:
 an ability to provide the second key to the second user device, and
 an ability to associate each of the second set of abilities with the second key; and when the determination indicates the first set of abilities includes the ability to provide the second key to the second user device and when the determination indicates the first set of abilities includes the ability to associate each of the second set of abilities with the second key:
 store, in the storage device and associated with the second key, second information pertaining to the second set of abilities, and
 provide, to the second user device over a second network, the second key.

12. The system of claim 11, wherein the first network and the second network are the same network.

13. The system of claim 11, wherein the first key is further associated with a first access priority for controlling the opening of the barrier,
 wherein the first request further asks that a second access priority for controlling the opening of the barrier be associated with the second key,
 wherein the determine step further includes determining whether the first set of abilities includes an ability to associate the second access priority with the second key, and
 wherein the stored second information further includes information pertaining to the second access priority when the determination indicates the first set of abilities includes the ability to provide the second key to the second user device, when the determination indicates the first set of abilities includes the ability to associate each of the second set of abilities with the second key, and when the determination indicates that the first set of abilities includes the ability to associate the second access priority with the second key.

14. The system of claim 13, wherein the determine step further includes determining that the first set of abilities includes the ability to provide another user only with an access priority that provides access that is equal to or less than the access provided by the first access priority, and wherein the stored second information includes the second access priority only when the second access priority provides access that is equal to or less than the access provided by the first access priority.

15. The system of claim 11, wherein the determine step further includes determining that the first set of abilities includes the ability to provide another user only with abilities from the first set of abilities, and wherein the stored second information includes the second set of abilities only when each ability in the second set of abilities is also in the first set of abilities.

16. The system of claim 11, wherein the first set of abilities includes:
 an ability to open the barrier;
 an ability to provide a new key to the second user device;
 an ability to provide an access priority to the second user device;
 an ability to provide at least one ability to the second user device;
 an ability to place a condition on an ability provided to the second user device; and
 an ability to control a peripheral device associated with the barrier.

17. The system of claim 11 wherein the determine step further includes:
 determining, from the first information, that a first ability from the first set of abilities is subject to one or more conditions; and
 determining, from the first information, that the first user is authorized to associate the first ability with the second key only when the first ability as provided to the second user device is made subject to the one or more conditions, wherein the stored second information includes the first ability when the determination indicates the first set of abilities includes the ability to provide the second key to the second user device, when the determination indicates the first set of abilities includes the ability to associate each of the second set of abilities with the second key, and when the determination indicates that the first ability as provided to the second user device is made subject to the one or more conditions.

18. The system of claim 17, wherein the one or more conditions pertain to at least one of:
 a number of times the ability may be exercised;
 a duration of time after which the ability may not be exercised;
 a time of day in which the ability may not be exercised; and
 a day of the week in which the ability may not be exercised.

19. The system of claim 11, the instructions when executed further causing the server to:
 provide, to the second user device, a list including the second set of abilities and any condition to which any ability of the second set of abilities is subject.

20. The system of claim 11, wherein the server receives the first request from the first user device after:
 the first user device receives over the second network a second request from the second user device, the second request asking the first user to open the barrier; and
 in response to the first request, the first user device is caused by the first user to send the second request.

* * * * *